(12) United States Patent
Nammi

(10) Patent No.: US 9,130,619 B2
(45) Date of Patent: Sep. 8, 2015

(54) FINDING CHANNEL STATE INFORMATION WITH REDUCED CODEBOOK IN A MULTI-ANTENNA WIRELESS COMMUNICATION SYSTEM

(71) Applicant: Telefonaktiebolaget L M Ericsson (publ), Stockholm (SE)

(72) Inventor: Sairamesh Nammi, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 118 days.

(21) Appl. No.: 13/748,212

(22) Filed: Jan. 23, 2013

(65) Prior Publication Data

US 2014/0205031 A1   Jul. 24, 2014

Related U.S. Application Data

(63) Continuation-in-part of application No. 13/610,319, filed on Sep. 11, 2012, now Pat. No. 9,048,908.

(51) Int. Cl.
*H04B 7/02*   (2006.01)
*H04B 7/04*   (2006.01)
*H04B 7/06*   (2006.01)

(52) U.S. Cl.
CPC ............ *H04B 7/0456* (2013.01); *H04B 7/0413* (2013.01); *H04B 7/0478* (2013.01); *H04B 7/0486* (2013.01); *H04B 7/063* (2013.01); *H04B 7/066* (2013.01); *H04B 7/0617* (2013.01)

(58) Field of Classification Search
USPC ........................................................ 375/267
See application file for complete search history.

(56) References Cited

U.S. PATENT DOCUMENTS

2009/0323840 A1   12/2009   Lee et al.
2011/0268204 A1   11/2011   Choi et al.
(Continued)

FOREIGN PATENT DOCUMENTS

EP   2 568 646 A1   3/2013
WO   2011/121499 A2   10/2011
(Continued)

OTHER PUBLICATIONS

International Search Report and Written Opinion mailed Mar. 2, 2014 in International Application No. PCT/EP2013/068378 (11 pages total).
(Continued)

*Primary Examiner* — Lihong Yu

(57) ABSTRACT

Multiple antennas employed at the transmitter and receiver can significantly increase a MIMO system capacity, especially when channel knowledge is available at the transmitter. Channel state information may be provided to the transmitter by the receiver in a codebook based precoding feedback. In a proposed approach is proposed in which the receiver conducts a search of precoder elements of a codebook to provide the transmitter with rank information and precoder control index that enhances capacity. Unlike the conventional exhaustive search, the proposed approach reduces complexity by reducing the search space of precoder elements for consideration. Performance loss is minimized by reducing the search space of higher rank precoder elements. For some ranks, the complexity is reduced without any performance sacrifice by grouping the precoder elements of the rank into groups of equivalent capacities and including at most one precoder element from each group into the search space.

11 Claims, 12 Drawing Sheets

(56) References Cited

U.S. PATENT DOCUMENTS

| | | |
|---|---|---|
| 2012/0076028 A1 | 3/2012 | Ko et al. |
| 2012/0120997 A1 | 5/2012 | Park et al. |
| 2013/0315284 A1 | 11/2013 | Nammi |
| 2014/0064393 A1 | 3/2014 | Sun et al. |

FOREIGN PATENT DOCUMENTS

| | | |
|---|---|---|
| WO | 2011/137595 A1 | 11/2011 |
| WO | 2013/068916 A1 | 5/2013 |

OTHER PUBLICATIONS

3GPP TS 25.212 V11.3.0, 3rd Generation Partnership Project; Technical Specification Group Radio Access Network; Multiplexing and channel coding (FDD) (Release 11), Sep. 2012 (135 pages).

3GPP TS 36.213 V11.0.0, 3rd Generation Partnership Project; Technical Specification Group Radio Access Network; Evolved Universal Terrestrial Radio Access (E-UTRA); Physical layer procedures (Release 11), Sep. 2012 (143 pages).

UTRA-UTRAN Long Term Evolution (LTE) and 3GPP System Architecture Evolution (SAE), Long Term Evolution of the 3GPP radio technology, Oct. 4, 2006 (8 pages).

Anna Scaglione et al., "Optimal Designs for Space-Time Linear Precoders and Decoders", IEEE Transactions on Signal Processing, vol. 50, No. 5, May 2002, pp. 1051-1064.

Hemanth Sampath et al., "Generalized Linear Precoder and Decoder Design for MIMO Channels Using the Weighted MMSE Criterion", IEEE Transactions on Communications, vol. 49, No. 12, Dec. 2001, pp. 2198-2206.

R1-125359; 3GPP TSG-RAN WG1 Meeting #71, New Orleans, Louisiana, USA, Nov. 12-16, 2012, Change Request (36 pages).

International Search Report and Written Opinion with transmittal sheet mailed Feb. 7, 2014 in corresponding International Application No. PCT/EP2013/063683 (11 pages total).

Inventor: Sairamesh Nammi, U.S. Appl. No. 13/610,319, filed Sep. 11, 2012, "Finding Channel State Information With Reduced Codebook in a Multi-Antenna Wireless Communication System".

FINDING CHANNEL STATE INFORMATION WITH REDUCED CODEBOOK IN A MULTI-ANTENNA WIRELESS COMMUNICATION SYSTEM

RELATED APPLICATION

This application claims priority and benefit of U.S. application Ser. No. 13/610,319 entitled "FINDING CHANNEL STATE INFORMATION WITH REDUCED CODEBOOK IN A MULTI-ANTENNA WIRELESS COMMUNICATION SYSTEM" filed on Sep. 11, 2012, which is incorporated herein by reference in its entirety.

TECHNICAL FIELD

The technical field of the present disclosure generally relates to a receiver in a wireless communication system providing feedback to a transmitter.

BACKGROUND

Multiple antennas employed at the transmitter and receiver can significantly increase the system capacity. By transmitting independent symbol streams in the same frequency bandwidth, usually referred to as spatial multiplexing (SM), achieves a linear increase in data rates with the increased number of antennas. On the other hand, by using space-time codes at the transmitter, reliability of the detected symbols can be improved by exploiting transmit diversity. Both schemes assume no channel knowledge at the transmitter.

However, in a practical wireless systems such as the 3GPP (3rd Generation Partnership Project) LTE (Long Term evolution), HSDPA (High Speed Downlink Packet Access), HSPA (High Speed Packet Access) and WiMAX (Worldwide Interoprability for Microwave Access) systems, the channel knowledge can be made available at the transmitter via feedback from the receiver to the transmitter. A MIMO (Multiple Input Multiple Output) transmitter can utilize this channel information to improve the system performance with the aid of precoding. In addition to beam forming gain, the use of precoding avoids the problem of ill-conditioned channel matrix.

In practice, complete CSI (channel state information) may be available for a communication system using TDD (time division duplex) scheme by exploiting channel reciprocity. However, for a FDD (frequency division duplex) system, complete CSI is more difficult to obtain. In a FDD system, some kind of CSI knowledge may be available at the transmitter via feedback from the receiver. These systems are called limited feedback systems. There are many implementations of limited feedback systems such as codebook based feedback and quantized channel feedback. 3GPP LTE, HSDPA and WiMAX recommend codebook based feedback CSI for precoding.

In a codebook based precoding, predefined codebook is defined both at transmitter and receiver. The entries of codebook can be constructed using different methods such as Grassmannian, Lyod algorithm, DFT matrix etc. The precoder matrix is often chosen to match the characteristics of the $N_R \times N_T$ MIMO channel matrix H ($N_R$ being the number of receive antennas and $N_T$ being the number of transmit antennas), resulting in a so called channel dependent precoding. This is also commonly referred to as closed-loop precoding and essentially strives for focusing the transmit energy into a signal subspace which is strong in the sense of conveying much of the transmitted energy to the UE (user equipment). The signal subspace in this context is a subspace of a signal space that is defined in any number of dimensions including space, time, frequency, code, etc.).

In addition, the precoder matrix may also be selected to strive for orthogonalizing the channel, meaning that after proper linear equalization at the UE, the inter-layer interference is reduced. At the receiver, it is common to find SINR (signal-to-interference-plus-noise ratio) with different codebook entries and choose the rank/precoding indicator (rank/precoding index) which gives the highest spectral efficiency (also referred to as channel capacity). In this context, rank indicates the number of data streams that can be simultaneously transmitted from a transmitter to a receiver.

The performance of a closed-sloop MIMO system generally improves with the cardinality (size) of the codebook set. At the receiver, RI (rank indicator or rank information) and PCI (precoding control indicator or precoding control index) are sent back to the transmitter every Tri (transmission time interval) or multiples of Tri (for example 5 in LTE, ⅓ in HSDPA). In general, finding the rank information and precoding control index is cumbersome and involves many computations. The complexity is huge in case of a closed-sloop MIMO when the codebook is large. For example, HSDPA/LTE defines a codebook for a 4-Tx antennas system with 64 codewords (16 codewords per rank). As the number of antennas increase, the complexity can increase exponentially. This makes it difficult to implement conventional methods of providing feedback to improve performance.

SUMMARY

One or more aspects of the disclosed subject matter relate to methods, apparatuses, and/or systems for use with a reduced codebook in a multi-antenna wireless communication system to find channel state information. The reduced codebook allows the receiver's complexity to be reduced when providing feedback to a transmitter.

A non-limiting aspect of the disclosed subject matter is directed to a method performed by a receiver to provide channel state information as feedback to a transmitter in a multi-antenna wireless communication system. The method may comprise estimating a channel between the transmitter and the receiver and determining a precoder subset. The precoder subset may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. At least one rank may be an equivalence capacity rank which is a rank where the precoder elements of the rank are grouped into one or more capacity groups. Each precoder element of the equivalence capacity rank may be a member of one capacity group, and at least one capacity group may include multiple precoder elements. Within each capacity group, individual capacities of the precoder elements of that capacity group may be equal. The precoder subset may be determined such that, for at least one equivalence capacity rank, no more than one precoder element from each capacity group of that equivalence capacity rank is included into the precoder subset. The method may also comprise determining a capacity corresponding to each precoder element in the precoder subset. The method may further comprise determining the channel state information associated with the precoder element whose corresponding capacity is maximum among the capacities corresponding to the precoder elements of the precoder subset. The method may yet further comprise and providing the channel state information to the transmitter as the feedback. The channel state information may include rank information (rank indicator, RI) and precoding control index (precoding control indicator, PCI).

Another non-limiting aspect of the disclosed subject matter is directed to a computer-readable medium which includes therein programming instructions. When a computer executes the programming instructions, the computer executes the method performed in a receiver to provide channel state information as feedback to a transmitter in a multi-antenna wireless communication system as described above.

Another non-limiting aspect of the disclosed subject matter is directed to a receiver of a multi-antenna wireless communication system in which the receiver may be structured to provide channel state information as feedback to a transmitter. The receiver may comprise a channel estimator, a precoder subset determiner, a capacity determiner, a channel state determiner, and a feedback provider. The channel estimator may be structured to estimate a channel between the transmitter and the receiver. The precoder subset determiner may be structured to determine a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. At least one rank may be an equivalence capacity rank as described above. The precoder subset may be determined such that, for at least one equivalence capacity rank, no more than one precoder element from each capacity group of that equivalence capacity rank is included into the precoder subset. The capacity determiner may be structured to determine, for each precoder element in the precoder subset, a capacity corresponding to that precoder element based on the channel estimation. The channel state determiner may be structured to determine the channel state information associated with the precoder element whose corresponding capacity is maximum among the capacities corresponding to the precoder elements of the precoder subset. The feedback provider may be structured to provide the channel state information to the transmitter as the feedback. The channel state information may include rank information (rank indicator, RI) and precoding control index (precoding control index, PCI).

Another non-limiting aspect of the disclosed subject matter is directed to a method performed by a transmitter to provide a procoder subset to a receiver in a multi-antenna wireless communication system. The method may comprise determining a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. At least one rank may be an equivalence capacity rank as described above. The precoder subset may be determined such that, for at least one equivalence capacity rank, no more than one precoder element from each capacity group of that equivalence capacity rank is included into the precoder subset. The method may also comprise providing the precoder subset to the receiver.

Another non-limiting aspect of the disclosed subject matter is directed to a computer-readable medium which includes therein programming instructions. When a computer executes the programming instructions, the computer executes the method performed in a transmitter to provide the precoder subset to a receiver in a multi-antenna wireless communication system as described above.

Another non-limiting aspect of the disclosed subject matter is directed to a transmitter of a multi-antenna wireless communication system in which the transmitter may be structured to provide precoder subset to a receiver. The transmitter may comprise a precoder subset provider structured to determine a precoder subset which may comprise one or more precoder elements, each of which may be a precoder element of a codebook defined for a plurality of ranks. For each rank, the codebook may comprise a plurality of precoder elements corresponding to that rank. The precoder subset may include less than all precoder elements of the codebook. At least one rank may be an equivalence capacity rank as described above. The precoder subset may be determined such that, for at least one equivalence capacity rank, no more than one precoder element from each capacity group of that equivalence capacity rank is included into the precoder subset. The capacity determiner may be structured to determine, for each precoder element in the precoder subset, a capacity corresponding to that precoder element based on the channel estimation. The precoder subset provider may also be structured to provide the precoder subset to the receiver.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
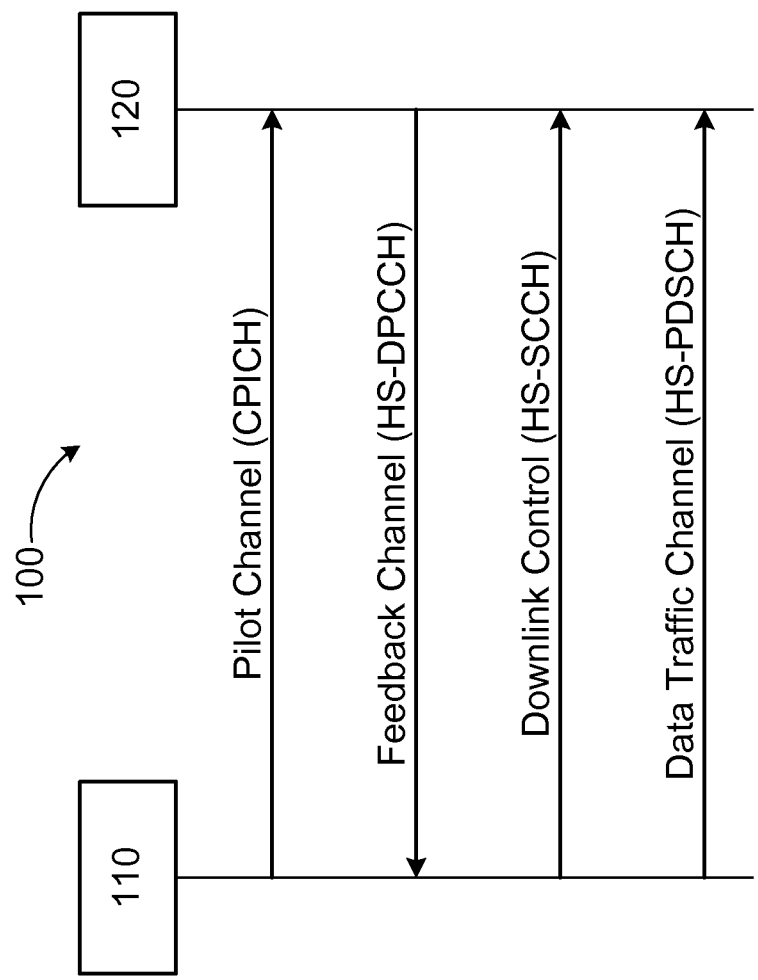
FIG. 1 illustrates an example of messages exchanged between a transmitter and a receiver during a typical call set up.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1xEVDO, Wireless LAN, WiFi, etc. Thus, the scope of this disclosure is not limited to the set of 3GPP wireless network systems and can encompass many domains of wireless communication systems. Also, a wireless terminal (e.g., UE, laptop, PDA, smart phone, mobile terminal, etc.) will be used as an example of a receiver in which the described method can be performed. That is, the descriptions generally will focus on the downlink transmissions. However, the subject matter is equally applicable to uplink transmissions. That is, the disclosed subject matter is applicable to any node of the network including base stations (e.g., RBS, NodeB, eNodeB, eNB, etc.) and relay stations that receive wireless signals.

As indicated above, finding the rank information and precoding index is cumbersome and involves many computations. For a closed-loop MIMO system, the complexity can be daunting when the codebook is large. For example, HSDPA/LTE defines a codebook for a 4-antennas system with 64 codewords (16 codewords per rank). In this description, the size of the codebook will be referred to by the number of codewords in the codebook. Thus, the size of the HSDPA/LTE codebook for the four branch MIMO system is 64.

In an aspect of the disclosed subject matter, an approach to reduce the computational complexity at the receiver is proposed. In this aspect, the proposed approach avoids full space search and uses a subset of the codebook for finding the channel state information such as rank information (rank indicator, RI), precoding control index (precoding control indicator, PCI), channel quality indicator (CQI), and so on. Simulation results show that performance degradation with the proposed approach is very small relative to that achieved by the full space search. Also, the complexity can be greatly reduced. In some instances, the complexity is reduced with no performance degradation.

Ideal linear precoding requires full channel state information (CSI) at the transmitter. This may be possible for TDD based systems, but is not practical for FDD based systems. Codebook based precoding allows the receiver to explicitly identify a precoding matrix/vector based on a codebook that should be used for transmission.

In 3GPP's HSDPA/LTE standard, separate codebooks are defined for various combinations of the number of transmit antennas and the number of transmission layers. The latter is also referred to as rank indicator or rank information (RI). As indicated above for example, for a four branch MIMO system, a total 64 precoding vectors and matrices are defined. Also for each rank in the codebook for the scenarios of RI=1, 2, 3, 4, sixteen (16) precoder elements per rank are defined. The 3GPP standard does not specify what criteria the UE should use to compute the RI and/or the optimum precoding matrices/vectors.

FIG. 1 illustrates an example of messages exchanged between two nodes—a transmitter 110 and a receiver 120—of a multi-antenna wireless communication system 100. In the downlink, the transmitter 110 may be a base station (e.g., Node B) and the receiver 120 may be a wireless terminal (e.g., a UE). In this example, the messages exchanged between a Node B and a UE during a typical call set up are illustrated. From signals transmitted by the Node B on a common pilot channel (CPICH), the UE estimates the channel and computes the channel quality information and precoding channel indicator (PCI). The UE reports this information along with hybrid ARQ ACK/NAK to the Node B as feedback on a feedback channel (e.g., High Speed-Dedicated Physical Control Channel, HS-DPCCH, in a HSPA system). The periodicity of HS-DPCCH is typically one subframe (2 msec). For example, once the UE decides about the RI and the corresponding PCI, the information is sent to Node B via the feedback or uplink channel.

Upon receiving the feedback information, the Node B decides the rank, modulation, transport block size, and the PCI for the data traffic. This information is conveyed through a downlink control channel (e.g., High Speed-Shared Control Channel, HS-SCCH, in HSPA). After transmitting the control information to the UE, the Node B then transmits the downlink data to the UE on a data traffic channel (e.g., High Speed-Physical Downlink Shared Channel, HS-PDSCH, in HSPA).

As indicated above, the Node B is the data transmitter and the UE is the data receiver in the downlink. Note that in the uplink, the roles are reversed. That is, the Node B is the receiver and the UE is the transmitter. It should be noted that some or all aspects of the described subject matter are equally applicable in the uplink.

Figure 2:
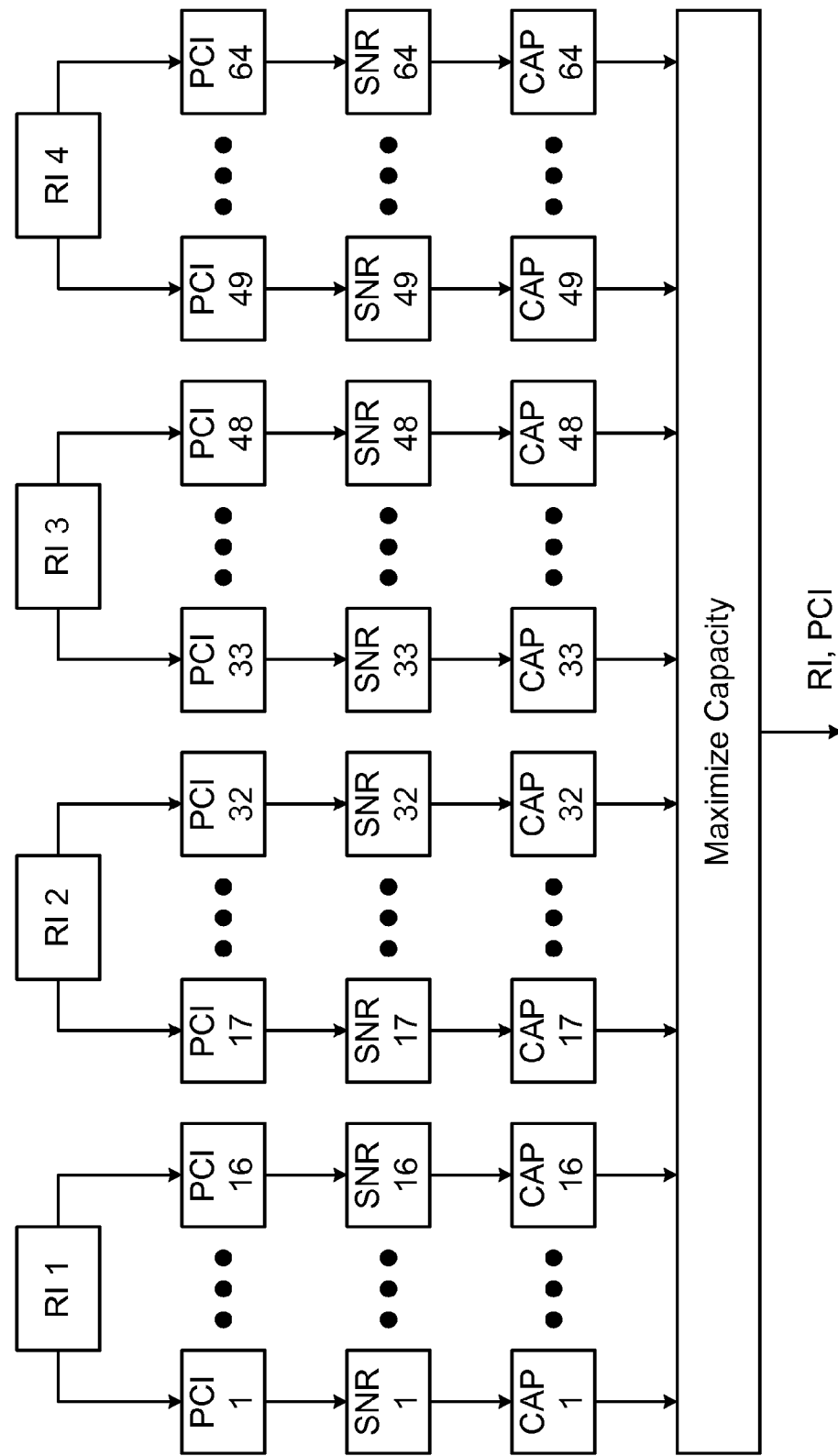
FIG. 2 pictorially illustrates a conventional algorithm for finding rank information and precoding control index for a four branch MIMO system.

FIG. 2 pictorially illustrates a conventional algorithm for finding RI and PCI for a four branch MIMO system. In the conventional approach, the precoding codebook (or simply codebook) contains 64 precoder elements (16 elements for each rank). A precoding codebook is shown in Table 1.

TABLE 1

| $\chi_{pwipb,1}$, $\chi_{pwipb,2}$, $\chi_{pwipb,3}$, $\chi_{pwipb,4}$ | $u_n$ | Number of transport blocks | | | |
|---|---|---|---|---|---|
| | | 1 | 2 | 3 | 4 |
| 0000 | $u_0 = [1\ -1\ -1\ -1]^T$ | $W_0^{\{1\}}$ | $\dfrac{W_0^{\{14\}}}{\sqrt{2}}$ | $\dfrac{W_0^{\{124\}}}{\sqrt{3}}$ | $\dfrac{W_0^{\{1234\}}}{2}$ |
| 0001 | $u_1 = [1\ -j\ 1\ j]^T$ | $W_1^{\{1\}}$ | $\dfrac{W_1^{\{12\}}}{\sqrt{2}}$ | $\dfrac{W_1^{\{123\}}}{\sqrt{3}}$ | $\dfrac{W_1^{\{1234\}}}{2}$ |
| 0010 | $u_2 = [1\ 1\ -1\ 1]^T$ | $W_2^{\{1\}}$ | $\dfrac{W_2^{\{12\}}}{\sqrt{2}}$ | $\dfrac{W_2^{\{123\}}}{\sqrt{3}}$ | $\dfrac{W_2^{\{3214\}}}{2}$ |
| 0011 | $u_3 = [1\ j\ 1\ -j]^T$ | $W_3^{\{1\}}$ | $\dfrac{W_3^{\{12\}}}{\sqrt{2}}$ | $\dfrac{W_3^{\{123\}}}{\sqrt{3}}$ | $\dfrac{W_3^{\{3214\}}}{2}$ |
| 0100 | $u_4 = \left[1\ \dfrac{-1-j}{\sqrt{2}}\ -j\ \dfrac{1-j}{\sqrt{2}}\right]^T$ | $W_4^{\{1\}}$ | $\dfrac{W_4^{\{14\}}}{\sqrt{2}}$ | $\dfrac{W_4^{\{124\}}}{\sqrt{3}}$ | $\dfrac{W_4^{\{1234\}}}{2}$ |
| 0101 | $u_5 = \left[1\ \dfrac{1-j}{\sqrt{2}}\ j\ \dfrac{-1-j}{\sqrt{2}}\right]^T$ | $W_5^{\{1\}}$ | $\dfrac{W_5^{\{14\}}}{\sqrt{2}}$ | $\dfrac{W_5^{\{124\}}}{\sqrt{3}}$ | $\dfrac{W_5^{\{1234\}}}{2}$ |
| 0110 | $u_6 = \left[1\ \dfrac{1+j}{\sqrt{2}}\ -j\ \dfrac{-1+j}{\sqrt{2}}\right]^T$ | $W_6^{\{1\}}$ | $\dfrac{W_6^{\{13\}}}{\sqrt{2}}$ | $\dfrac{W_6^{\{134\}}}{\sqrt{3}}$ | $\dfrac{W_6^{\{1324\}}}{2}$ |
| 0111 | $u_7 = \left[1\ \dfrac{-1+j}{\sqrt{2}}\ j\ \dfrac{1+j}{\sqrt{2}}\right]^T$ | $W_7^{\{1\}}$ | $\dfrac{W_7^{\{13\}}}{\sqrt{2}}$ | $\dfrac{W_7^{\{134\}}}{\sqrt{3}}$ | $\dfrac{W_7^{\{1324\}}}{2}$ |
| 1000 | $u_8 = [1\ -1\ 1\ 1]^T$ | $W_8^{\{1\}}$ | $\dfrac{W_8^{\{12\}}}{\sqrt{2}}$ | $\dfrac{W_8^{\{124\}}}{\sqrt{3}}$ | $\dfrac{W_8^{\{1234\}}}{2}$ |
| 1001 | $u_9 = [1\ -j\ -1\ -j]^T$ | $W_9^{\{1\}}$ | $\dfrac{W_9^{\{14\}}}{\sqrt{2}}$ | $\dfrac{W_9^{\{134\}}}{\sqrt{3}}$ | $\dfrac{W_9^{\{1234\}}}{2}$ |
| 1010 | $u_{10} = [1\ 1\ 1\ -1]^T$ | $W_{10}^{\{1\}}$ | $\dfrac{W_{10}^{\{13\}}}{\sqrt{2}}$ | $\dfrac{W_{10}^{\{123\}}}{\sqrt{3}}$ | $\dfrac{W_6^{\{1324\}}}{2}$ |
| 1011 | $u_{11} = [1\ j\ -1\ j]^T$ | $W_{11}^{\{1\}}$ | $\dfrac{W_{11}^{\{13\}}}{\sqrt{2}}$ | $\dfrac{W_{11}^{\{134\}}}{\sqrt{3}}$ | $\dfrac{W_{11}^{\{1324\}}}{2}$ |
| 1100 | $u_{12} = [1\ -1\ -1\ 1]^T$ | $W_{12}^{\{1\}}$ | $\dfrac{W_{12}^{\{12\}}}{\sqrt{2}}$ | $\dfrac{W_{12}^{\{123\}}}{\sqrt{3}}$ | $\dfrac{W_{12}^{\{1234\}}}{2}$ |
| 1101 | $u_{13} = [1\ -1\ 1\ -1]^T$ | $W_{13}^{\{1\}}$ | $\dfrac{W_{13}^{\{13\}}}{\sqrt{2}}$ | $\dfrac{W_{13}^{\{123\}}}{\sqrt{3}}$ | $\dfrac{W_{13}^{\{1324\}}}{2}$ |
| 1110 | $u_{14} = [1\ 1\ -1\ -1]^T$ | $W_{14}^{\{1\}}$ | $\dfrac{W_{14}^{\{13\}}}{\sqrt{2}}$ | $\dfrac{W_{14}^{\{123\}}}{\sqrt{3}}$ | $\dfrac{W_{14}^{\{3214\}}}{2}$ |

TABLE 1-continued

| $\chi_{pwipb,1}$, $\chi_{pwipb,2}$, $\chi_{pwipb,3}$, $\chi_{pwipb,4}$ | $u_n$ | \multicolumn{4}{c}{Number of transport blocks} |
|---|---|---|---|---|---|
| | | 1 | 2 | 3 | 4 |
| 1111 | $u_{15} = [1\ 1\ 1\ 1]^T$ | $W_{15}^{\{1\}}$ | $\dfrac{W_{15}^{\{12\}}}{\sqrt{2}}$ | $\dfrac{W_{15}^{\{123\}}}{\sqrt{3}}$ | $\dfrac{W_{15}^{\{1234\}}}{2}$ |

The precoding weight information $x_{pwipb,1}$, $x_{pwipb,2}$, $x_{pwipb,3}$ and $x_{pwipb,4}$ are mapped according to Table 1. The quantity $w_n^{\{s\}}$ denotes the matrix defined by columns given by the set $\{s\}$ from an expression $w_n = I - 2u_n u_n^H / u_n^H u_n$, where I is the 4×4 identity matrix and the vector $u_n$ is given by Table 1.

The received SNR at the output of the MIMO detector (MMSE, MLD etc.) is a function of the channel matrix H, the precoding matrix, the noise power spectral density and the co-channel interference power. The conventional algorithm for finding the RI and PCI consists of the following steps performed by the receiver, e.g., by the UE in the downlink:
Compute channel coefficients by estimating the channel based on the signals on the common pilot channel;
Compute capacity of each codebook element for all elements in the codebook;
Find the PCI and the RI corresponding to the codebook element that maximizes the capacity.

Referring to FIG. 2, the receiver computes 64 capacities (C1 to C64), one corresponding to each codebook element in the codebook, based on the channel estimation. In other words, an exhaustive search is performed. As an illustration in 3GPP, for each rank index (rank indicator), the standard defines 16 elements of precoding indices (precoding indicators). Hence for each precoding index in that rank, the UE computes the SINR. Based on the SINR the achievable capacity is computed using the Shannon's formula. Once the UE computes the capacities for each rank and precoding indices, it chooses the one which maximizes the capacity. As an example, if the receiver determines that C48 is the highest, then the receiver would provide RI 3 and PCI 48 as feedback to the transmitter.

It can be seen that the exhaustive search of the conventional algorithm involves many computations. As the number of antennas increase, the number of codebook elements can increase exponentially. Thus, it may become impossible, or at least impractical, to implement the exhaustive search called for by the conventional algorithm as the MIMO systems become more complex.

In an aspect, an approach is proposed which takes less number of computations to determine the CSI (e.g., RI, PCI, precoding matrix indicator, PMI, CQI, SINR, etc.) with little to no sacrifice in performance as compared to the conventional exhaustive approach. In general, the computation reduction can be achieved through computing the capacities of only a subset of the codebook elements, i.e., less than all codebook elements are considered. Reducing the search space implies that some precoder elements will not be considered. Thus, it is possible that the best precoder element will not be included in the precoder subset, meaning that performance can degrade with the reduced search space relative to the conventional exhaustive search.

Such issue is addressed in the U.S. application Ser. No. 13/610,319 entitled "Finding Channel State Information With Reduced Codebook In A Multi-Antenna Wireless Communication System" filed on behalf of the inventor of the present subject matter. For ease of reference, this will be referred to as the '319 application.

In a MIMO system, the codebook of the system may be defined for a plurality of ranks, and the codebook may include a plurality of precoder elements for each rank. In such a system, the search space can be reduced by reducing the search space of one or more ranks. Within a rank, there are a total of N precoder elements, and n of the precoder elements within the rank may be considered, i.e., that n out of N precoder elements of that rank are selected or otherwise chosen and their corresponding capacities are computed. When n=N for a rank, this equates to performing a rank exhaustive search for that rank. The conventional exhaustive search then can be equated with performing the rank exhaustive search for all ranks in the codebook.

In the '319 application, the search space is reduced for at least one rank, i.e., n<N meaning that less than all precoder elements of that rank are considered. By reducing the search space of considered precoder elements for one or more ranks, the search space as a whole can be reduced relative to the conventional exhaustive search. For ease of expression, the search space is reflected in a precoder subset. The precoder subset can include one or more precoder elements, each of which is a precoder element of the codebook. When n<N for at least one rank, then the precoder subset includes less than all elements of the codebook.

In the '319 application, the performance sacrifice is kept to a minimum by intelligently choosing the codebook elements to be included in the search space. In a method of the '319 application, a receiver determines a precoder subset comprising one or more precoder elements, each of which is a precoder element of a codebook such that the precoder subset includes less than all precoder elements of the codebook. In determining the precoder subset, for each rank, the receiver determines whether or not that rank is above a rank threshold. If so, then some number n of the precoder elements are randomly chosen such that n<N. This is in part based on the observation that as the rank is increased, the performance loss does not become noticeable until the number of elements is decreased to a greater degree. So lesser number of higher rank precoder elements can be included.

While the method in the '319 application mitigates performance loss very well, the inventor has found that for one or more ranks, further reduction in performance loss can be achieved without increasing complexity. In some instances, zero performance loss relative to the exhaustive search can be achieved. Inventor observed that for one or more ranks, the precoder elements of that rank have symmetric properties. Table 2 illustrates a snapshot of an example rank information and precoding index calculations for HSDPA system with 4-Tx and 4-Rx antennas. The table shows results logged for rank 4 calculations.

TABLE 2

| Precoding index | Layer capacities | | | | Total capacity |
| --- | --- | --- | --- | --- | --- |
| | 1st layer | 2nd layer | 3 layer | 4th layer | |
| 1 | 3.8892 | 3.4997 | 3.2687 | 2.5496 | 13.2072 |
| 2 | 2.2498 | 3.5618 | 4.3521 | 3.5302 | 13.6939 |
| 3 | 3.8892 | 2.5496 | 3.2687 | 3.4997 | 13.2072 |
| 4 | 2.2498 | 3.5302 | 4.3521 | 3.5618 | 13.6939 |
| 5 | 2.5395 | 4.1169 | 3.8757 | 2.914 | 13.4456 |
| 6 | 2.6821 | 2.6645 | 4.8575 | 3.6009 | 13.8050 |
| 7 | 3.8752 | 2.5395 | 2.914 | 4.1169 | 13.4456 |
| 8 | 4.8575 | 2.6821 | 3.6009 | 2.6645 | 13.8050 |
| 9 | 3.4997 | 3.8892 | 2.5496 | 3.2687 | 13.2072 |
| 10 | 3.5618 | 2.2498 | 3.5302 | 4.3521 | 13.6939 |
| 11 | 2.5496 | 3.4997 | 3.2687 | 3.8892 | 13.2072 |
| 12 | 3.5302 | 3.5618 | 4.3521 | 2.2498 | 13.6939 |
| 13 | 3.2731 | 3.8975 | 3.3054 | 2.6550 | 13.1311 |
| 14 | 3.8975 | 2.655 | 3.2731 | 3.3054 | 13.1311 |
| 15 | 3.2731 | 2.655 | 3.3054 | 3.8975 | 13.1311 |
| 16 | 2.655 | 3.3054 | 3.8975 | 3.2731 | 13.1311 |

From Table 2, the following can be observed:

precoding indices [1, 3, 9 and 11] (referred to as capacity group A for convenience) have same total capacities of 13.2072;

precoding indices [2, 4, 10 and 12] (capacity group B) have same total capacities of 13.6939;

precoding indices [5 and 7] (capacity group C) have same total capacities of 13.4456;

precoding indices [6 and 8] (capacity group D) have same total capacities of 13.8050; and precoding indices [13, 14, 15 and 16] (capacity group E) have same total capacities of 13.1311.

For simplicity and ease of reference, the phrase "equivalence capacity rank" will be used, which may be viewed as a rank where:

the precoder elements of the rank are grouped into one or more capacity groups (e.g., capacity groups A, B, C, D, E of rank 4 HSDPA);

each precoder element of the rank is a member of one capacity group (e.g., precoder index 1 is member of capacity group A);

at least one capacity group includes multiple precoder elements (e.g., capacity group A includes five elements); and within each capacity group, individual capacities of the precoder elements are equal (each precoder element of capacity group A has a capacity of 13.2072).

Rank 4 of the HSDPA system with 4-Tx and 4-Rx antennas would then qualify as an equivalence capacity rank. In this particular instance, there are five capacity groups (capacity groups A, B, C, D, E), and each capacity group includes multiple rank 4 precoder elements (each capacity group has at least two). For ease of reference, $N_G$ will be used to represent the number of capacity groups in an equivalence capacity rank. Since at least one capacity includes multiple precoder elements, this necessarily means that $N_G<N$, number of capacity groups is less than the number of precoder elements, for each equivalence capacity rank.

In Table 2, $N_G=5$ for rank 4. Note that for each of these five capacity groups, the individual layer capacities of the precoder elements are asymmetrically equivalent, i.e., within each group, a layer capacity of one precoder element (each corresponding to a precoding index) of that group is equal to a layer capacity of another precoder element of the same group. For example, for precoder element 1 of capacity group A, the 1st layer capacity is 3.8892. For precoder elements 3, 9 and 11 of the same capacity group, 3.8892 is the capacity of the $1^{st}$, $2^{nd}$ and $4^{th}$ layer, respectively.

Figure 3:
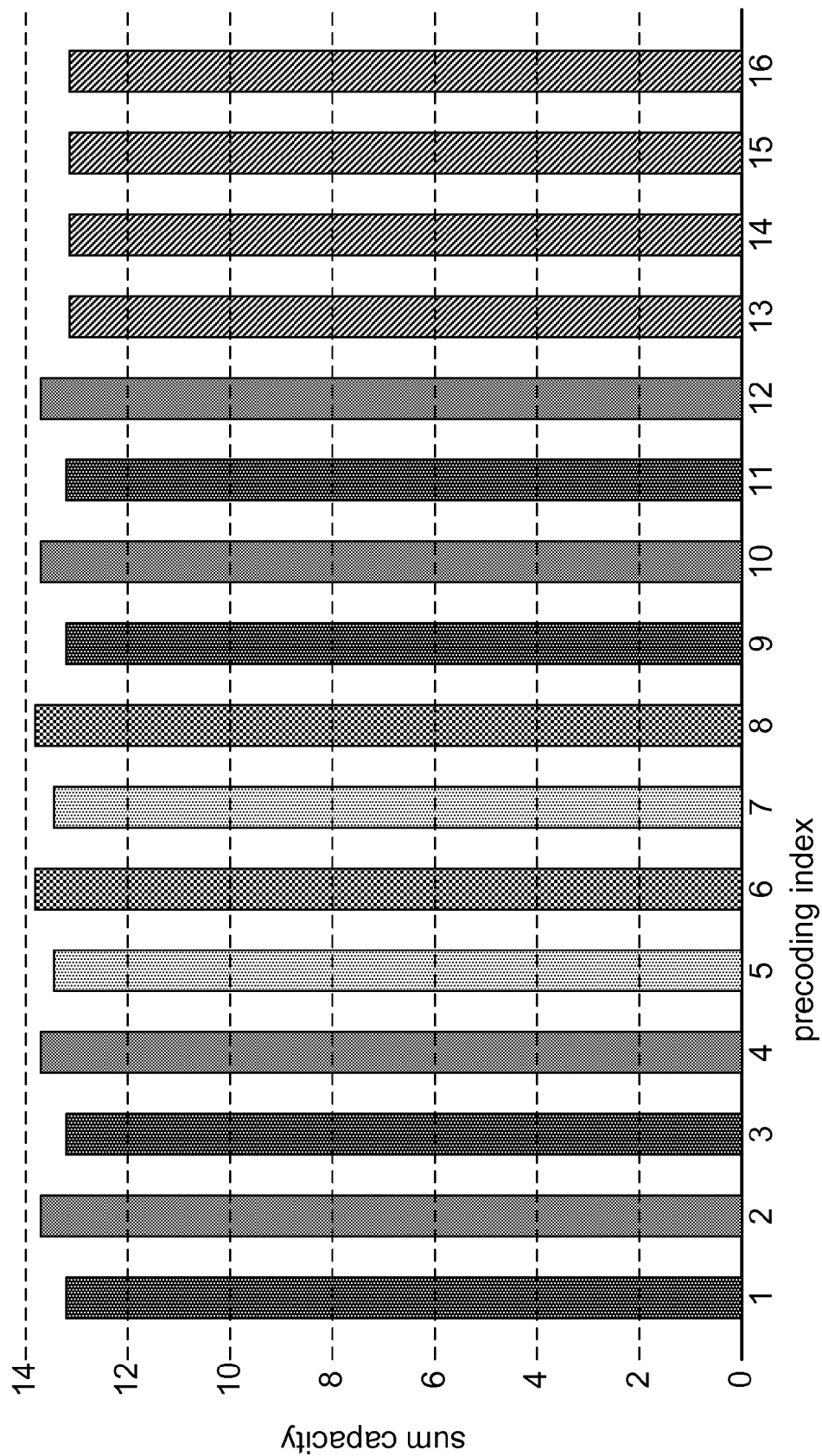
FIG. 3 illustrates an example bar plot of total capacities of individual precoder elements for a rank 4 transmission in HSDPA.

The asymmetric equivalence is due to the structure of precoding codebook chosen for HSDPA. FIG. 3 shows a bar plot for the total capacity for individual precoding indices. For each group, the precoding indices of that group are shaded the same. It can be seen that instead of computing individual capacities for all N=16 precoder elements, the capacities of 5 elements—one from each group—can be computed, which reduces the complexity by almost a factor of 4 with no loss of performance. A same phenomenon can be observed for various channels with different speeds and delay profiles.

Figure 4:
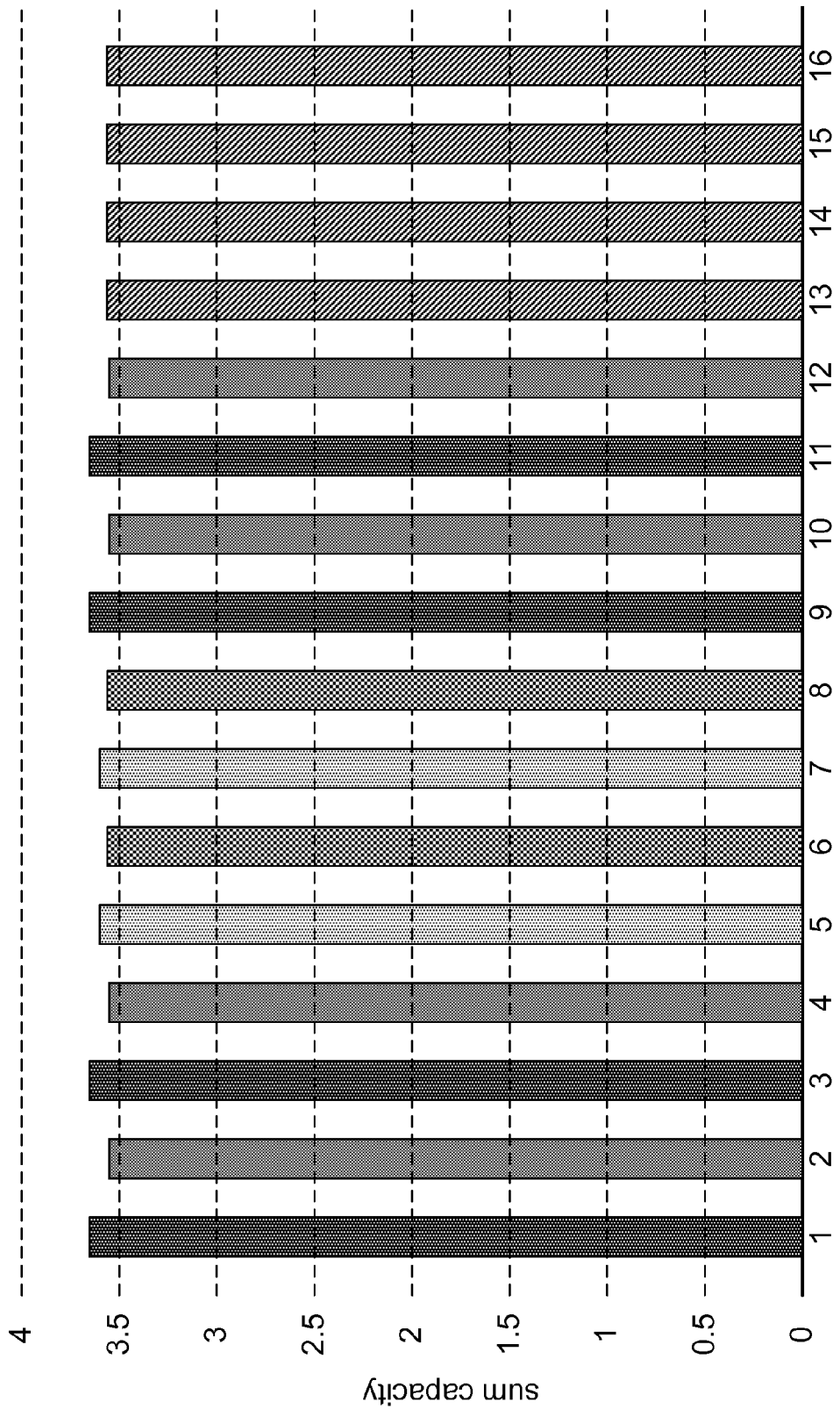
FIG. 4 illustrates an example bar plot of total capacities of individual precoder elements for a rank 4 downlink transmission in LTE.

The asymmetric equivalence for rank 4 transmissions is also true of 3GPP LTE transmissions. That is, 3GPP LTE rank 4 is also an example of an equivalence capacity rank. FIG. 4 shows the sum capacity for rank 4 transmissions for LTE downlink transmission with closed loop MIMO. Similar to the HSDPA rank 4 transmissions, the capacities of elements in each capacity group are equal. Hence, the number of elements for rank 4 computation can be reduced to 5 without any performance loss. This means that for that rank, there is no need to perform a rank exhaustive search. It is enough to compute the capacity of one precoder element of each group since other precoder elements of that group will have the same capacity. In this way, capacities of less than all precoder elements can be calculated and no performance loss will result.

To state it another way, for each equivalence capacity rank, computational complexity can be reduced through a group exhaustive search without compromising on the performance. Group exhaustive search may be viewed as determining for that equivalence capacity rank, capacities of n precoder elements of the rank where $n=N_G$, and where the capacity of one precoder element from each group is determined.

Note that even if group exhaustive search is not performed, i.e., when $n<N_G$, on average, it should still result in better performance than the method of the '319 application. For example, assume that n=4. According to the '319 method, the likelihood of randomly selecting the best performing precoder element is 25% (4 out of 16). But under the current proposal, the likelihood increases to 80% (4 out of 5).

Figure 5:
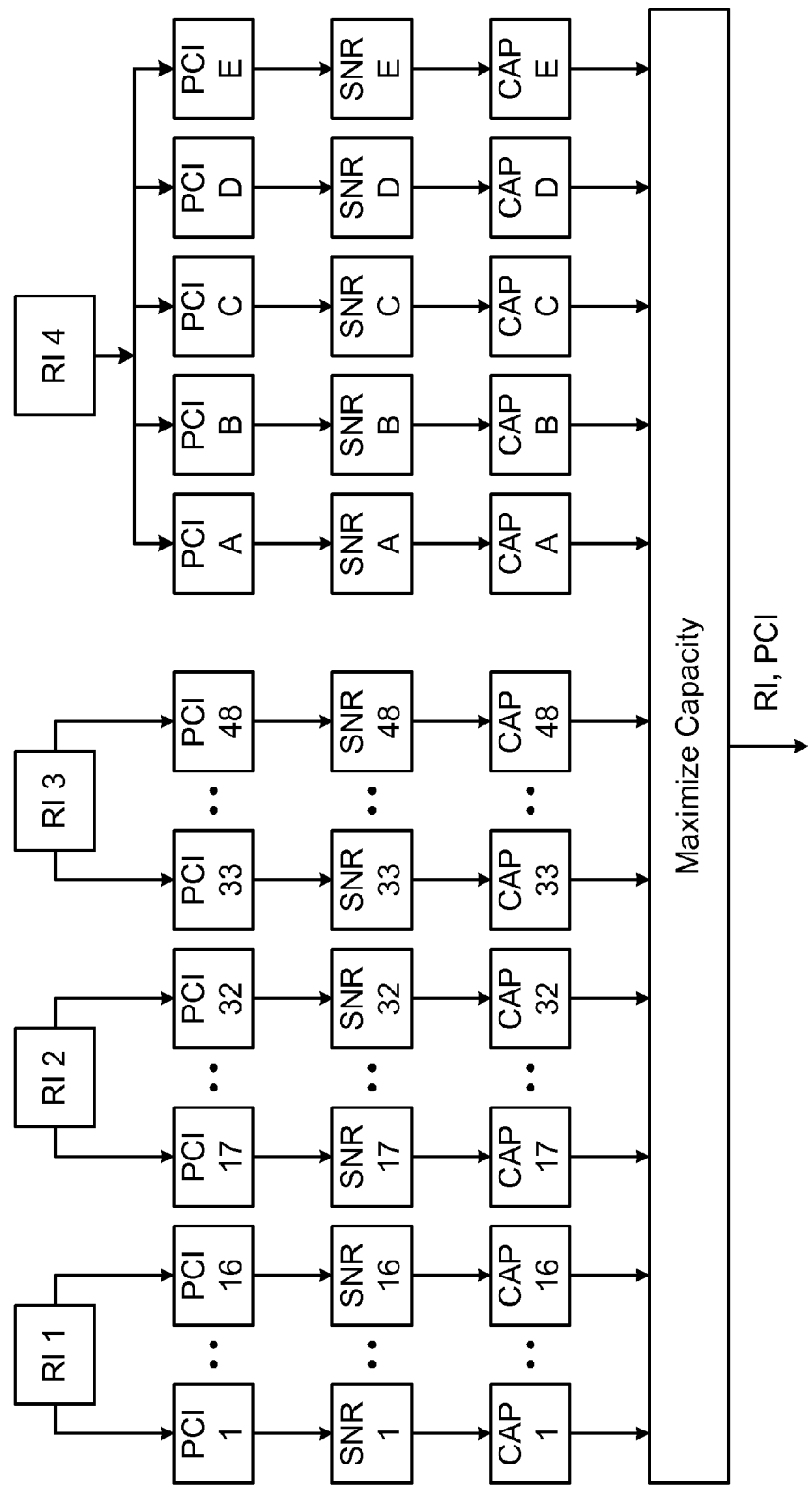
FIG. 5 pictorially illustrates an example of an algorithm for finding rank information and precoding control index for a MIMO system.

FIG. 5 pictorially illustrates an example of a proposed algorithm for finding rank information and precoding control index for a four branch MIMO system. For rank 4, observe that at most 5 precoder elements are necessary. They can be any one of [1, 3, 9, 11] (from group A), any one of [2, 4, 10, 12] (from group B), any one of [5, 7] (from group C), any one of [6, 8] (from group D) and any one of [13, 14, 15, 16] (from group E). Since the capacities are equivalent for the chosen precoder elements, there is no capacity loss. For other ranks, the method of the '319 application may be used or even rank exhaustive search may be performed. For example, for ranks 1, 2 and 3, rank exhaustive search may be performed.

Figure 6:
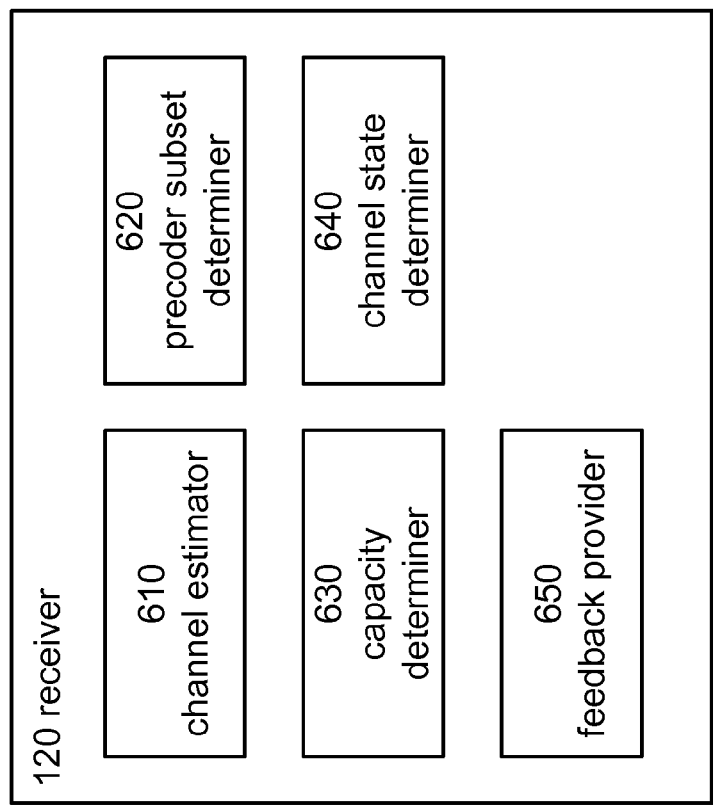
FIG. 6 illustrates an embodiment of a receiver of a wireless network structured to provide channel state information to a transmitter.

FIG. 6 illustrates an embodiment of a receiver 120 of a multi-antenna wireless network 100 that is structured to provide channel state information as feedback to a transmitter 110 in accordance with an example of the proposed approach. As seen, the receiver 120 may include a channel estimator 610, a precoder subset determiner 620, a capacity determiner 630, a channel state determiner 640 and a feedback provider 650.

FIG. 6 provides a logical view of the receiver 120 and the devices included therein. It is not strictly necessary that each device be physically separate from other devices. Some or all devices may be combined in one physical module. Conversely, at least one device may be divided into physically separate modules.

Figure 7:
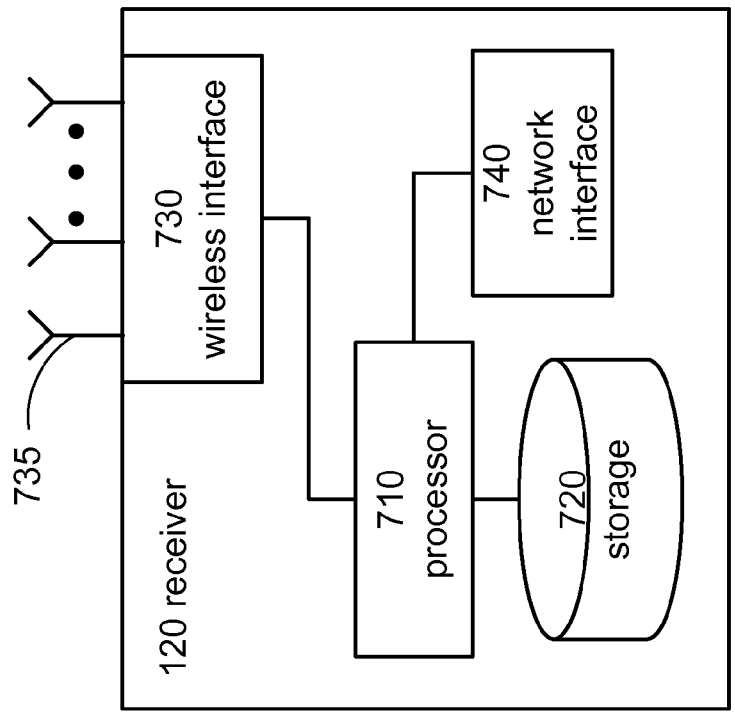
FIG. 7 illustrates another embodiment of a receiver of a wireless network structured to provide channel state information to a transmitter.

Also, the devices of the receiver 120 need not be implemented strictly in hardware. It is envisioned that the devices can be implemented through any combination of hardware and software. For example, as illustrated in FIG. 7, the receiver 120 may include one or more processors 710, one or more storage 720, and one or both of a wireless interface 730 and a network interface 740. The processor 710 may be structured to execute program instructions to perform the operations of one or more of the receiver devices. The instructions may be stored in a non-transitory storage medium or in firmware (e.g., ROM, RAM, Flash). Note that the program instructions may also be received through wired and/or wireless transitory medium via one or both of the wireless and network interfaces 730, 740. The wireless interface 730 (e.g., a transceiver) may be structured to receive signals from and send signals to other radio network nodes via one or more antennas 735, which may be internal or external. The network interface 740 may be included and structured to communicate with other radio and/or core network nodes.

Figure 8:
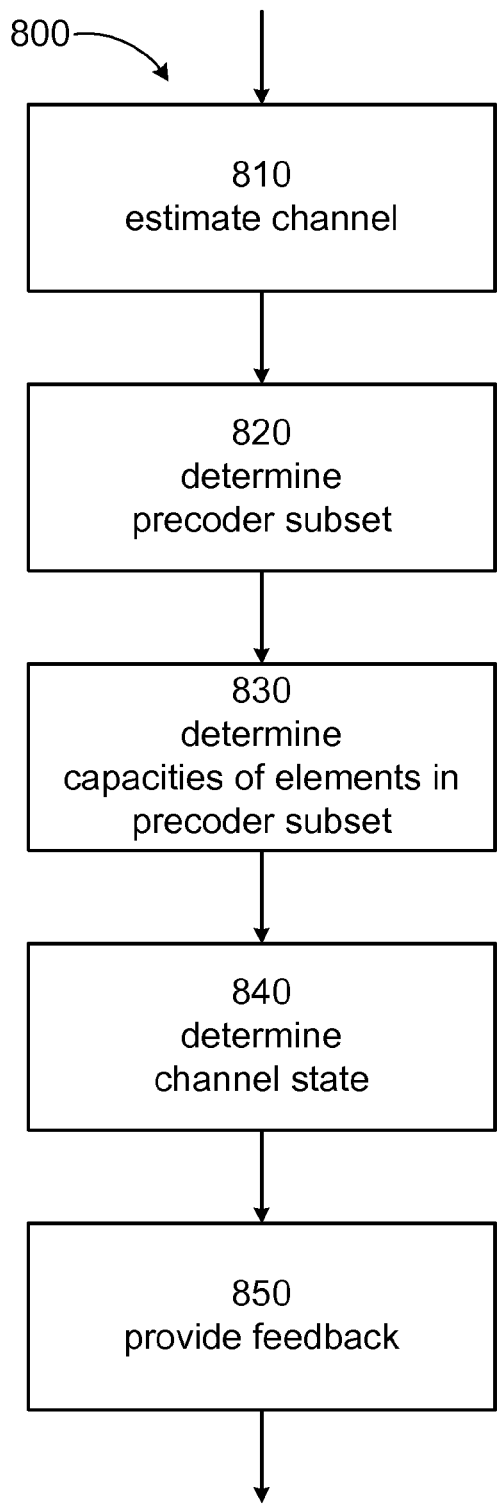
FIG. 8 illustrates a flow chart of an example method performed by a receiver to provide channel state information to a transmitter.

FIG. 8 illustrates a flow chart of an example method 800 performed by the receiver 120 to provide channel state information as feedback to the transmitter 110 in accordance with the proposed approach. In step 810, the channel estimator 610 may estimate the channel between the transmitter 110 and the receiver 120. For example, the transmitter 110 may transmit pilot symbols on a pilot channel such as CPICH which are received via the wireless interface 730 at the receiver 120. From these symbols, the channel estimator 610 may estimate the channel, and may also compute the channel coefficients.

In step 820, the precoder subset determiner 620 may determine the precoder subset. In this step, the precoder subset determiner 620 may select or otherwise choose which of the precoder elements of the codebook are included in the precoder subset. Note that not all precoder elements of the codebook are included in the subset, i.e., the search space should be reduced relative to that of the conventional exhaustive search. Thus, the precoder subset includes one or more precoder elements of the codebook, but less than all precoder elements of the codebook.

Figure 9:
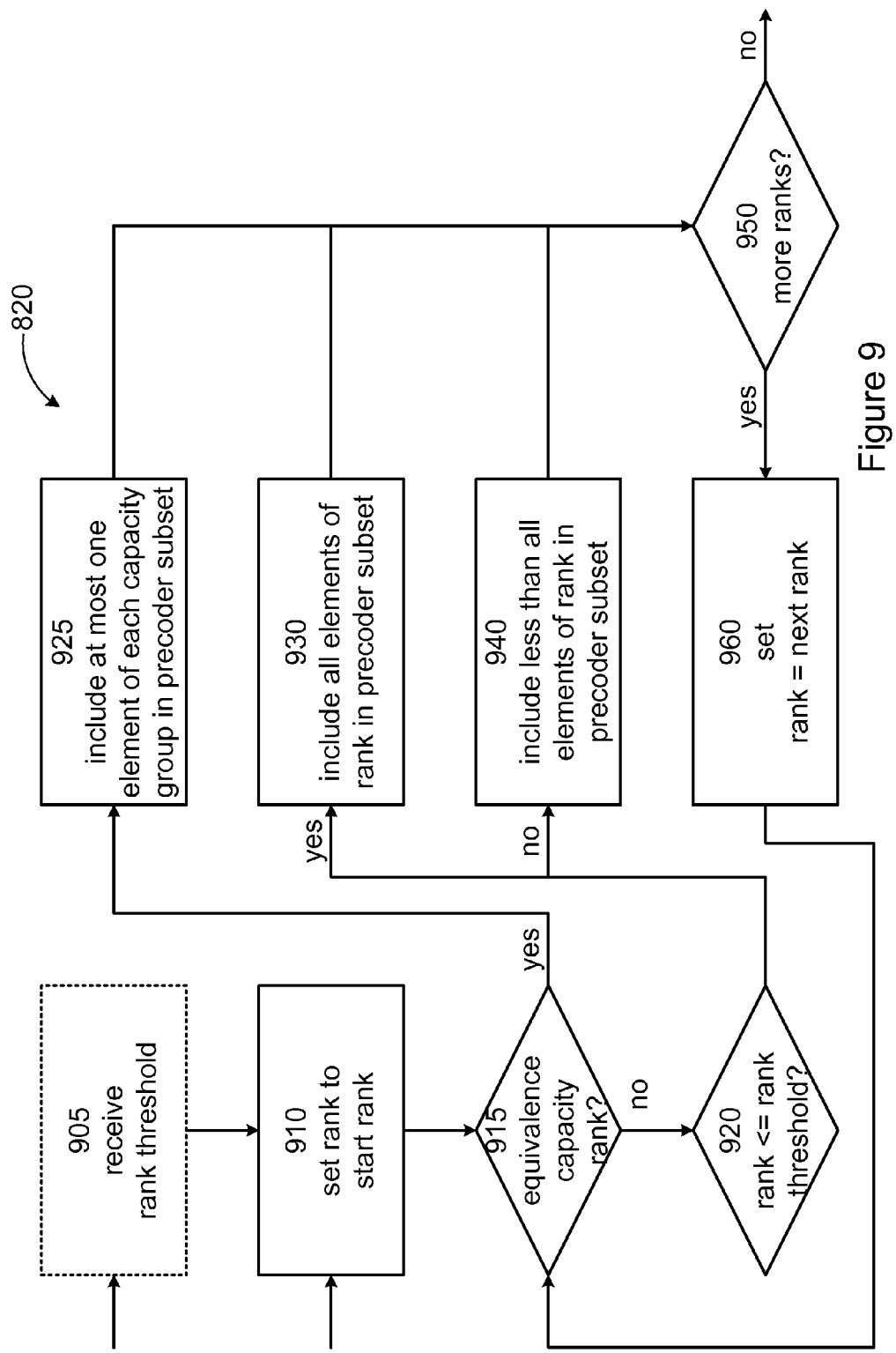
FIG. 9 illustrates a flow chart of an example process performed by a receiver to determine a precoder subset.

The precoder subset determiner 620 may determine the precoder subset in various ways. FIG. 9 illustrates a flow chart of an example process to implement step 820. In this example process, a similar procedure may be iterated through each of the plurality of ranks. The process may start at step 910 where the precoder subset determiner 620 initializes the rank to a start rank. For example, in the four branch MIMO system, the precoder subset determiner 620 may start at rank 1 (RI=1).

For each rank, in step 915, the precoder subset determiner 620 may determine whether or not the rank is an equivalence capacity rank. If the rank is determined to be an equivalence capacity rank (such as rank 4), then in step 925, the precoder subset determiner 620 may include at most one precoder element from each capacity group into the precoder subset, i.e., $n \leq N_G$. In the example of Table 2, five or less precoder elements of rank 4 may be included into the precoder subset.

In one embodiment, one from each capacity group of the equivalence capacity rank may be included, i.e., $n=N_G$. That is, a group exhaustive search may be performed. When $n=N_G$, in as far as that equivalence capacity rank is concerned, no performance loss will result relative to rank exhaustive search.

Regardless of whether $n=N$, or $n<N_G$, for each capacity group that has a precoder element included in the precoder subset, the choice of the precoder element for inclusion may be made in multiple ways. In one way, the choice may be fixed, e.g., defined internally within the receiver 120. For example, for group A, the precoder subset determiner 620 may always choose precoder element 3. In another way, the precoder subset determiner 620 may randomly choose among the precoder elements of the group. In yet further way, the choice may be received from the transmitter 110. The received choice may override any internally defined choice or any previously received choice.

If the rank is determined to be a non-equivalence capacity rank in step 915, the method proceeds to step 920. In this step, the precoder subset determiner 620 may determine whether or not the rank is at or above a rank threshold. In one aspect, the rank threshold may be internally defined within the receiver 120. Optionally, the precoder subset determiner 620 may receive the rank threshold from the transmitter 110 in step 905. When received, the received rank threshold may override any internally defined rank threshold and/or any previously received rank threshold.

If the rank is determined to be at or below the rank threshold, then in step 930, the precoder subset determiner 620 may include all precoder elements of that rank of the codebook in the precoder subset. However, if the rank is determined to be above the rank threshold, then in step 940, the precoder subset determiner 620 may include some, but not all, precoder elements of that rank of the codebook in the precoder subset.

Note that for a given rank above the rank threshold, the precoder elements of that rank to be included in the precoder subset may be fixed, i.e., determined beforehand. For example, a list specifying the precoder elements of that rank to be included may be internally defined within the receiver 120. Alternatively, the list may be received from the transmitter 110. When received, the received list may override any internally defined list and/or any previously received list.

When the fixed list is specified, the precoder subset determiner 620 may choose the listed precoder elements of that rank to be included in the precoder subset in accordance with the fixed list in step 940. But in another aspect, the precoder elements of the given rank need not be determined beforehand. In this instance, the precoder subset determiner 620 may randomly choose a number of precoder elements of that rank to be included in the precoder subset in step 940. Of course, a combination is possible. That is, some of the precoder elements of the given rank may be fixed and some may be randomly chosen.

Although some or all of the precoder elements themselves may be randomly chosen, the number of the precoder elements of the given rank included in the precoder subset may be fixed. That is, for each rank above the threshold, the number of precoder elements to be included may be defined internally and/or received from the transmitter 110. If the number is received from the transmitter 110, the received number may override the internally defined number and/or any previously received number. Preferably, the number should be less than the total number of precoder elements in the codebook, i.e., $n<N$ for each rank above the rank threshold. In some instances, the number could even be zero.

Note that all ranks above the rank threshold need not be commonly treated. That is, for one rank, there may be fixed list. But for another rank, the precoder elements may be chosen at random. For another rank still, some may be fixed and the rest may be chosen at random.

In an aspect, the precoder subset may include precoder elements of at least two ranks—first and second ranks—both of which are above the rank threshold and in which the first rank is lower than the second rank. When this occurs, the number of first rank precoder elements in the precoder subset may be greater than the number of second rank precoder elements. This reflects an application of the observation that as the rank increases, similar performance loss does not become noticeable until the number of elements is decreased to a greater degree. Thus, lesser number of precoder elements can be considered for higher ranks. The first and second ranks need not always be consecutive. Also, note that the number of first rank precoder elements need not always be greater than the number of second rank precoder elements, i.e., they may be equal. Then more generally, it can be said that the number of first rank precoder elements may be equal to or greater than the number of second rank precoder elements.

FIG. 9 illustrates a scenario in which the receiver 120 performs the bulk of the legwork to determine the precoder subset. While not illustrated, the transmitter 110 itself may specify the precoder elements of each rank to be included in the precoder subset, regardless of whether or not the rank is above, at, or below the rank threshold. For example, the transmitter 110 may not have the capacity to transmit with certain RI/PCI combination. In this case, there is no need for the receiver 120 to even consider the associated precoder element. Thus, in another aspect, the precoder subset determiner 620 may simply receive the precoder subset from the transmitter 110 in step 940. Alternatively, the precoder subset determiner 620 may receive one or more criteria for inclusion (e.g., the transmitter 110 may specify that precoder elements associated with 16QAM modulation be considered) or exclusion (e.g., the transmitter 110 may specify that it cannot handle certain combinations of PCI and RI) or both.

Of course, variations and combinations are contemplated to be within the scope of this disclosure. For example, the precoder subset determiner 620 may receive a list of precoder elements to be excluded (or criteria for exclusion) from the precoder subset. Then the method 900 illustrated in FIG. 9 may be performed for the remaining precoder elements of the codebook.

Figure 10:
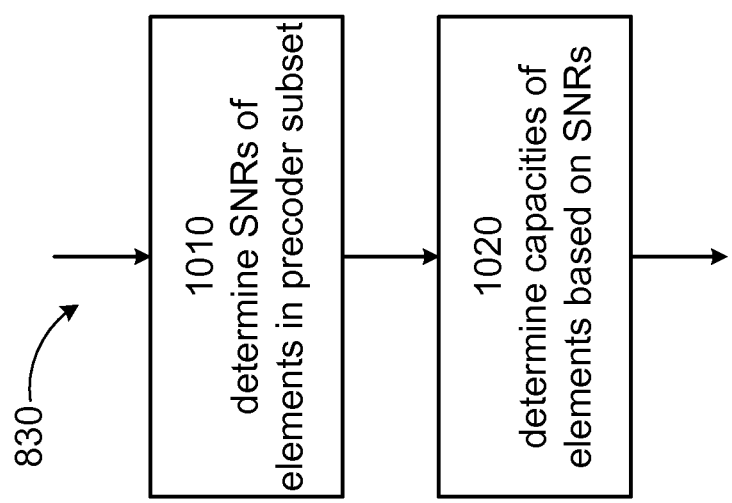
FIG. 10 illustrates a flow chart of an example process performed by a receiver to determine capacities of precoder elements.

Referring back to FIG. 8, after the precoder subset has been determined in step 820, the capacity corresponding each precoder element for all precoder elements in the precoder subset may be determined in step 830. FIG. 10 illustrates a flow chart of an example process that may be performed to implement step 830. In step 1010, the capacity determiner 630 may determine the SNRs associated with each precoder element in the precoder subset. The SNRs associated each precoder element may be determined based on the channel estimations made by the channel estimator 610. Note that SNR should be viewed in a general sense to include other expressions that conceptualizes the presence of desirable and undesirable signals such as SIR and SINR.

In step 1020, the capacity determiner 630 may determine the capacity corresponding to each precoder element based on the associated SNR. For example, the capacity C may be computed using the formula $C=B \log_2(1+SNR)$ for each precoder element, where B is the bandwidth.

But as an alternative, after the SNR is determined, the capacity determiner 630 may determine the modulation and coding scheme (MCS) needed with that SNR. For example, the capacity determiner 630 may determine the MCS through lookup tables. Once the MCS is chosen, the capacity determiner 630 may determine the spectral efficiency. In this alternative, higher spectral efficiency corresponds to higher capacity. Thus, maximizing capacity can be equated with maximizing spectral efficiencies. This alternative can be applicable in LTE precoding matrix indicator (PMI) search. In that sense, FIGS. 2 and 5 can be said to also correspond to the LTE PMI searches.

Again referring back to FIG. 8, after the capacities of the corresponding precoder elements in the subset are determined, then in step 840, the channel state determiner 640 may determine the channel state information associated with the precoder element whose corresponding capacity is maximum among the determined capacities of the precoder subset. For LTE PMI search, this may equate to the channel state determiner 640 determining the channel state information associated with the precoder element whose corresponding spectral efficiency is maximum among the determined spectral efficiencies of the precoder subset.

Figure 11:
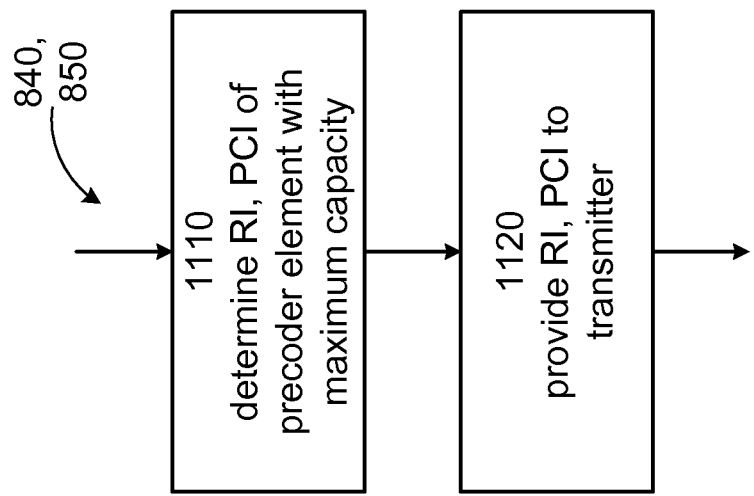
FIG. 11 illustrates an example process performed by a receiver to determine a channel state.

A flow chart of an example process to implement the steps 840 and 850 is illustrated FIG. 11. In step 1110, the channel state determiner 640 may determine the CSI of the precoder element with the maximum capacity. The CSI may include rank information (RI) and precoder control index (PCI). The CSI may also include channel quality information (CQI). It should be noted that unless specifically indicated otherwise, the terms RI and PCI should be taken in a generic sense and not be limited to any particular technology or standard such as 3GPP. In this context, RI should be taken to indicate a number of transmission layers or streams. Also PCI should be taken to be a reference (e.g., a pointer, an index) that can be used to find or determine a corresponding precoder element (e.g., PCI may be an index to a lookup table of precoder elements). In step 1120, the feedback provider 650 may provide the RI and PCI, among other information, to the transmitter 110. Note that PCI may be referred to in other similar concepts such as the PMI. That is, LTE's PMI concept can be taken to be within the scope of the PCI discussed immediately above.

Note that maximizing the capacity is not the only selection criteria. Instead of or in addition to capacity, throughputs, error rates, etc. of the precoder elements may be determined, optimized, and reported as feedback in steps 830, 840, and 850.

Figure 12:
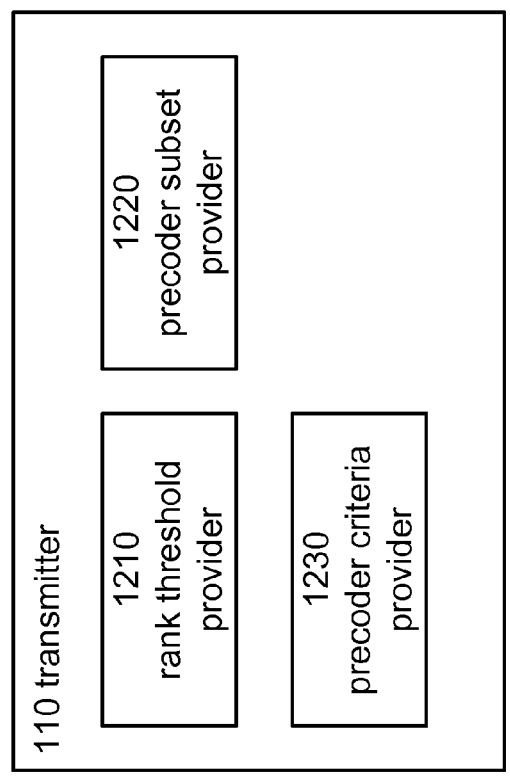
FIG. 12 illustrates an embodiment of a transmitter of a wireless network structured to provide a precoder subset to a receiver.

Recall from above that the transmitter 110 may provide the precoder subset to the receiver 120. FIG. 12 illustrates an embodiment of a transmitter 110 of a multi-antenna wireless network 100 that is structured to provide the precoder subset. As seen, the transmitter 110 may a precoder subset provider 1220. Optionally, the transmitter 110 may also include one or both of a rank threshold provider 1210 and a precoder criteria provider. FIG. 12 provides a logical view of the transmitter 110 and the devices included therein. It is not strictly necessary that each device be physically separate from other devices. Some or all devices may be combined in one physical module. Conversely, at least one device may be divided into physically separate modules.

Figure 13:
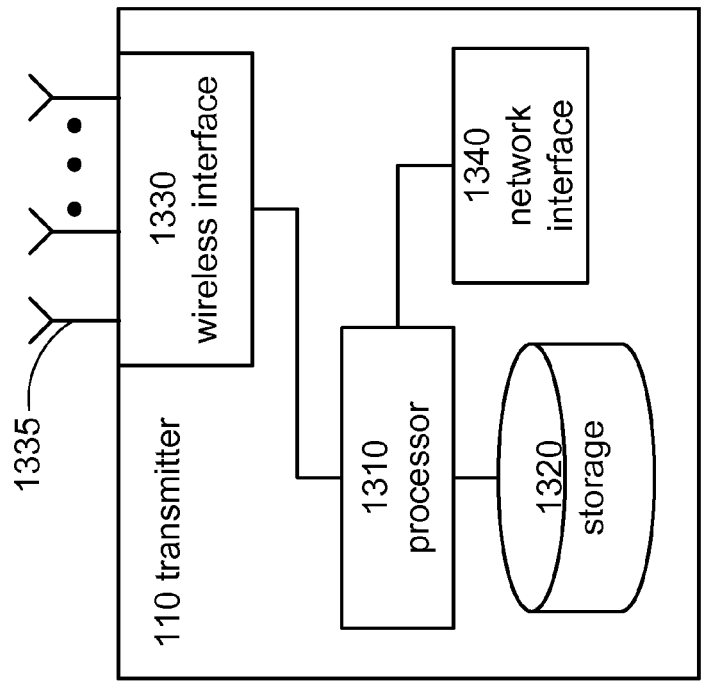
FIG. 13 illustrates another embodiment of a transmitter of a wireless network structured to provide a precoder subset to a receiver.

Also, the devices of the transmitter 110 need not be implemented strictly in hardware. It is envisioned that the devices can be implemented through any combination of hardware and software. For example, as illustrated in FIG. 13, the transmitter 110 may include one or more processors 1310, one or more storage 1320, and one or both of a wireless interface 1330 and a network interface 1340. The processor 1310 may be structured to execute program instructions to perform the operations of one or more of the receiver devices. The instructions may be stored in a non-transitory storage medium or in firmware (e.g., ROM, RAM, Flash). Note that the program instructions may also be received through wired and/or or wireless transitory medium via one or both of the wireless and network interfaces 1330, 1340. The wireless interface 1330 may be structured to receive signals from and send signals to other radio network nodes via one or more antennas 1335, which may be internal or external. The network interface 1340 may be included and structured to communicate with other radio and/or core network nodes.

Figure 14:
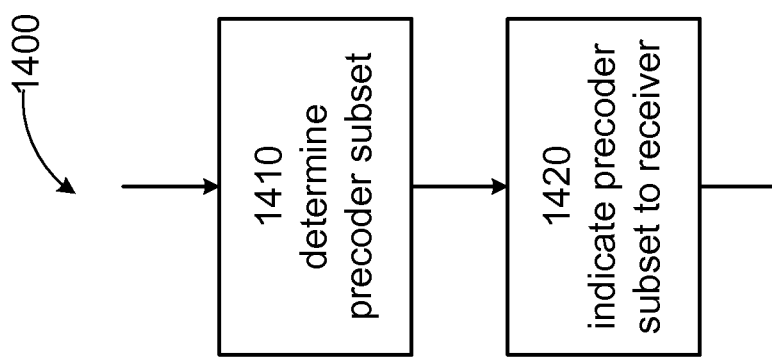
FIG. 14 illustrates a flow chart of an example method performed by a transmitter to provide a precoder subset to a receiver.

FIG. 14 illustrates a flow chart of an example method 1400 performed by the transmitter 110 to provide the precoder subset to the receiver 120. In step 1410, the precoder subset provider 1220 may determine the precoder subset. In this step, the precoder subset provider 1220 may select or otherwise choose which of the precoder elements of the codebook are included in the precoder subset. Thus, the precoder subset includes one or more precoder elements of the codebook, but less than all precoder elements of the codebook.

Figure 15:
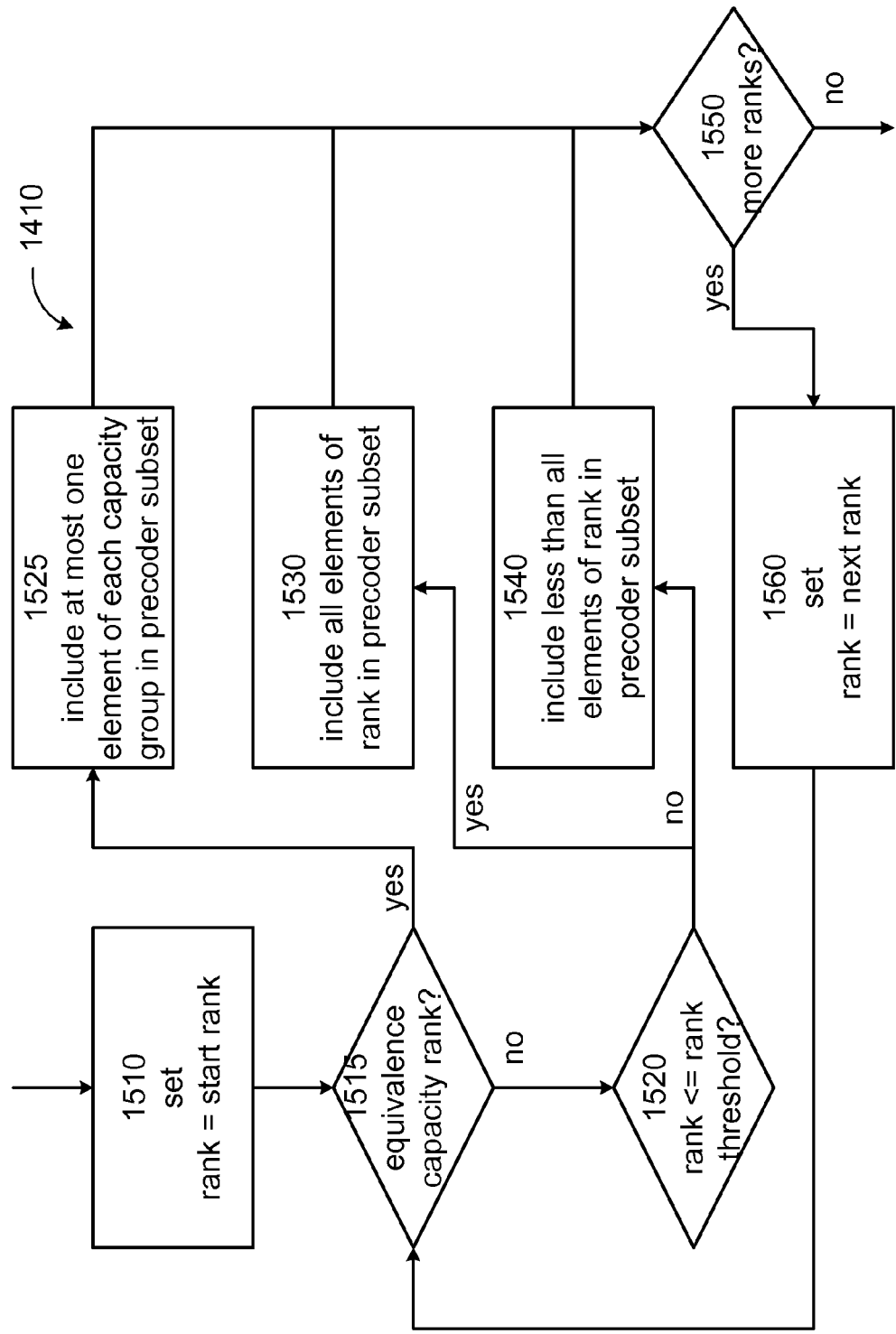
FIG. 15 illustrates a flow chart of an example process performed by a transmitter to determine a precoder subset.

A flow chart of an example process to implement step 1410 is illustrated in FIG. 15. As seen, the precoder subset provider 1220 may iterate through steps 1510-1560 for each of the plurality of ranks to determine the precoder subset. These steps are similar to the steps 910-960 illustrated in FIG. 9. The process may start at step 1510 where the precoder subset provider 1220 initializes the rank to a start rank. For example, in the four branch MIMO system, the precoder subset determiner 620 may start at rank 1 (RI=1).

For each rank, in step 1515, the precoder subset subset provider 1220 may determine whether or not the rank is an equivalence capacity rank. If the rank is determined to be an equivalence capacity rank, then in step 1525, the precoder subset subset provider 1220 may include at most one precoder element from each capacity group into the precoder subset. Again, when $n=N_G$, no performance loss will result relative to rank exhaustive search. For each capacity group that has a precoder element included in the precoder subset, the choice of the precoder element for inclusion may be made in multiple ways. In one way, the choice may be fixed, e.g., defined within the transmitter 110. In another way, the precoder subset provider 1220 may randomly choose among the precoder elements of the group. As indicated above, the steps of FIG. 15 are similar to the steps illustrated in FIG. 9. Therefore, the detailed descriptions of steps 1520-1560 will be omitted for simplicity.

Referring back to FIG. 14, the method 1400 also includes step 1420 in which the precoder subset provider 1220 wirelessly provides the precoder subset to the receiver 120. In this step, it is intended that the phrase "provide" be interpreted broadly as providing any information that is sufficient to allow the receiver 120 to determine the composition of the precoder subset. For example, in one embodiment, the information may comprise indices of the precoder elements that are included in the precoder subset. In another embodiment, the information may be comprise indices of those precoder elements that are excluded from consideration, which is advantageous when the number of excluded elements is small and the number of included elements is large. In yet another embodiment, the information may be in a form of a bitwise mask in which each bit position of the mask corresponds to a particular precoder element of the codebook, and the bit value indicates whether or not the corresponding precoder element is included in the precoder subset.

Codebook subset restriction in LTE and HSDPA will be used to illustrate the example in which the transmitter 110 (e.g., eNB) can recommend what precoder elements the receiver 120 (e.g., a UE) has to search during its RI/PCI/PMI computation when it reports channel state information. According to 3GPP standard TS 36.213, a UE is restricted to report PMI and RI within a precoder codebook subset specified by a bitmap parameter codebookSubsetRestriction configured by higher layer signaling (e.g., RRC layer signaling). For a specific precoder codebook and associated transmission mode, the bitmap can specify all possible subsets of the precoder codebook from which the UE can assume the eNB may be using when the UE is configured in the relevant transmission mode. Codebook subset restriction is supported for open-loop spatial multiplexing, closed-loop spatial multiplexing, multi-user MIMO and closed-loop rank=1 precoding. The resulting number of bits for each transmission mode is given in Table 1. The bitmap forms the bit sequence $a_{A_c-1}, \ldots, a_3, a_2, a_1, a_0$ where $a_0$ is the LSB and $a_{A_c-1}$ is the MSB and where a bit value of zero indicates that the PMI and RI reporting is not allowed to correspond to precoder(s) associated with the bit. The association of bits to precoders for the relevant transmission modes are given as follows in Table 3. Hence, it can be seen that the eNB can reduce the complexity at the UE in computing the RI/PMI.

TABLE 3

| | | Number of bits $A_C$ | |
|---|---|---|---|
| | | 2 antenna ports | 4 antenna ports |
| Transmission mode | Open-loop spatial multiplexing | 2 | 4 |
| | Closed-loop spatial multiplexing | 6 | 64 |
| | Multi-user MIMO | 4 | 16 |
| | Open-loop rank = 1 precoding | 4 | 16 |

Figure 16:
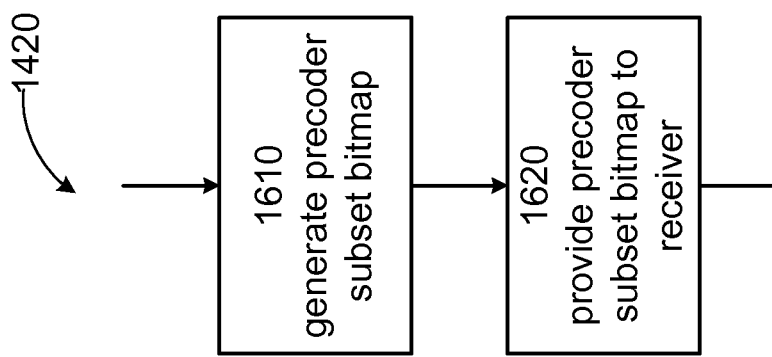
FIG. 16 illustrates a flow chart of an example process performed by a transmitter to indicate a precoder subset to a receiver.

FIG. 16 illustrates a flow chart of an example process to implement step 1420. In step 1610, the precoder subset provider 1220 may generate a precoder subset bitmap (e.g., codebookSubsetRestriction bitmap) based on the precoder subset. Each bit of the precoder subset bitmap corresponds to a precoder element of the codebook. A first value (one or zero) of each bit may indicate that CSI reporting is allowed for the corresponding precoder element, and a second value (the other of one or zero) may indicate that CSI reporting is not allowed for the corresponding precoder element. For example, of the 16 bits corresponding to the equivalence capacity rank 4, at most five bits—one bit from each capacity group—may be set to the first value and the rest may be set to the second value. In step 1620, the precoder subset provider 1220 may provide the precoder subset bitmap to the receiver 120. A layer (e.g., RRC layer) higher than physical layer may be used to provide the bitmap.

There are many advantages associated with one or more aspects of the disclosed subject matter. A non-exhaustive list of advantages include:

Simple to implement;

Complexity of RI/PCI or RI/PMI reporting can be reduced without reducing throughput for one or more ranks;

Easily extended to greater number of antennas (e.g., eight) with large codebook sizes (the advantages become greater).

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a receiver to provide channel state information (CSI) as feedback to a transmitter in a multi-antenna wireless communication system, the method comprising:
   estimating a channel between the transmitter and the receiver;
   determining a precoder subset comprising one or more precoder elements, each precoder element being a precoder element of a codebook, and the precoder subset including less than all precoder elements of the codebook;
   for each precoder element in the precoder subset, determining a capacity corresponding to that precoder element based on the channel estimation;
   determining the CSI associated with the precoder element whose corresponding capacity is maximum among the capacities corresponding to the precoder elements of the precoder subset; and
   providing the CSI to the transmitter as the feedback, the CSI comprising a rank information (RI) and a precoding control index (PCI),
   wherein the codebook is defined for a plurality of ranks,
   wherein for each rank, the codebook comprises a plurality of precoder elements corresponding to that rank,
   wherein at least one rank is an equivalence capacity rank, the precoder elements of each equivalence capacity rank being grouped into one or more capacity groups in which
      each precoder element is a member of one capacity group,
      at least one capacity group includes multiple precoder elements, and
      within each capacity group, individual capacities of the precoder elements of that capacity group are equal, and
   wherein the step of determining the precoder subset comprises, for at least one equivalence capacity rank, including at most one precoder element from each capacity group of that equivalence capacity rank into the precoder subset.

2. The method of claim 1, wherein for at least one equivalence capacity rank, the step of including at most one precoder element from each capacity group comprises including one precoder element from each capacity group of that equivalence capacity rank into the precoder subset.

3. The method of claim 1, wherein for at least one equivalence capacity rank, the step of including at most one precoder element from each capacity group comprises any one of:
   choosing the precoder element, which is fixed, of that capacity group to be included in the precoder subset;
   randomly choosing the precoder element of that capacity group to be included in the precoder subset; and
   receiving the precoder element of that capacity group to be included in the precoder subset from the transmitter.

4. The method of claim 1, wherein for at least one non-equivalence capacity rank above a rank threshold, the step of determining the precoder subset comprises including less than all precoder elements of that rank in the precoder subset.

5. The method of claim 1, wherein the multi-antenna wireless communication system includes a MIMO system with four transmit antennas, and at least one equivalence capacity rank is 4.

6. A non-transitory storage medium which has stored therein programming instructions such that when a computer executes the programming instructions in a receiver, the computer executes the method according to claim 1 to provide channel state information (CSI) as feedback to a transmitter in a multi-antenna wireless communication system.

7. A receiver of a multi-antenna wireless communication system, the receiver structured to provide channel state information (CSI) as feedback to a transmitter, the receiver comprising:
   a channel estimator structured to estimate a channel between the transmitter and the receiver;
   a precoder subset determiner structured to determine a precoder subset comprising one or more precoder elements, each precoder element being a precoder element of a codebook, and the precoder subset including less than all precoder elements of the codebook;
   a capacity determiner structured to determine, for each precoder element in the precoder subset, a capacity corresponding to that precoder element based on the channel estimation;
   a channel state determiner structured to determine the CSI associated with the precoder element whose corresponding capacity is maximum among the capacities corresponding to the precoder elements of the precoder subset; and
   a feedback provider structured to provide the CSI to the transmitter as the feedback, the CSI comprising a rank information (RI) and a precoding control index (PCI),
   wherein the codebook is defined for a plurality of ranks,
   wherein for each rank, the codebook comprises a plurality of precoder elements corresponding to that rank,
   wherein at least one rank is an equivalence capacity rank, the precoder elements of each equivalence capacity rank being grouped into one or more capacity groups in which
      each precoder element is a member of one capacity group,
      at least one capacity group includes multiple precoder elements of the equivalence capacity rank, and
      within each capacity group, individual capacities of the precoder elements of that capacity group are equal, and
   wherein for at least one equivalence capacity rank, the precoder subset determiner is structured to include at most one precoder element from each capacity group of that equivalence capacity rank into the precoder subset.

8. The receiver of claim 7, wherein for at least one equivalence capacity rank, the precoder subset determiner is structured to include one precoder element from each capacity group of that equivalence capacity rank into the precoder subset.

9. The receiver of claim 7, wherein for at least one equivalence capacity rank, the precoder subset determiner is structured to:
   choose the precoder element, which is fixed, of that capacity group to be included in the precoder subset,
   randomly choose the precoder element of that capacity group to be included in the precoder subset, or
   receive the precoder element of that capacity group to be included in the precoder subset from the transmitter.

10. The receiver of claim 7, wherein for at least one non-equivalence capacity rank above a rank threshold, the precoder subset determiner is structured to include less than all precoder elements of that rank in the precoder subset.

11. The receiver of claim 7, wherein the multi-antenna wireless communication system includes a MIMO system with four transmit antennas, and at least one equivalence capacity rank is 4.

* * * * *

UNITED STATES PATENT AND TRADEMARK OFFICE
CERTIFICATE OF CORRECTION

PATENT NO. : 9,130,619 B2  
APPLICATION NO. : 13/748212  
DATED : September 8, 2015  
INVENTOR(S) : Nammi Page 1 of 1

It is certified that error appears in the above-identified patent and that said Letters Patent is hereby corrected as shown below:

In the Specification

In Column 1, Line 12, delete "Sep. 11, 2012," and insert -- Sep. 11, 2012, now Pat. No. 9,048,908 --, therefor.

In Column 2, Line 17, delete "Tri" and insert -- TTI --, therefor.

In Column 2, Line 18, delete "Tri" and insert -- TTI --, therefor.

In Column 13, Line 65, delete "n=N," and insert -- $n=N_G$ --, therefor.

Signed and Sealed this  
Twenty-second Day of March, 2016

Michelle K. Lee  
*Director of the United States Patent and Trademark Office*